Figure 1:
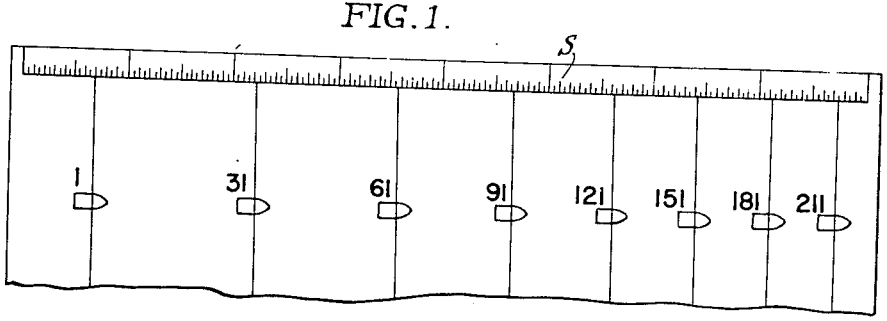

Dec. 22, 1953  F. E. TUTTLE ET AL  2,663,217
METHOD FOR DETERMINING THE VELOCITY AND ACCELERATION
CHARACTERISTICS OF MOVING OBJECTS
Filed April 27, 1950

FORDYCE E. TUTTLE
WALTER C. NEWCOMB
Daniel J. Mayne
INVENTORS
BY
ATTORNEYS

Patented Dec. 22, 1953

2,663,217

UNITED STATES PATENT OFFICE 2,663,217

METHOD FOR DETERMINING THE VELOCITY AND ACCELERATION CHARACTERISTICS OF MOVING OBJECTS

Fordyce E. Tuttle and Walter C. Newcomb, Rochester, N. Y., assignors to Eastman Kodak Company, Rochester, N. Y., a corporation of New Jersey Application April 27, 1950, Serial No. 158,621

6 Claims. (Cl. 88—14)

1

The present invention relates to photography and particularly to a method of photographically determining the velocity and acceleration characteristics of high-speed objects.

One form of the present invention is a modification of the methods of photographically determining the velocity and acceleration characteristics of high-speed objects disclosed in our copending applications Serial No. 158,619 and Serial No. 158,620, filed on even date herewith. The present invention is similar to the inventions disclosed in these noted copending applications in that the preferred embodiment thereof involves making a photographic record of the object through a multiple lined screen and viewing the record so obtained through a like lined screen. It differs, however, in the manner in which the record is exposed and, hence, in the results which are obtained when viewing the record.

One object of the present invention is to provide a method of determining the velocity and acceleration characteristics of an object having a substantially rectilinear motion.

A further object is to provide a method of determining the velocity and acceleration characteristics of a moving object which involves making successive instantaneous exposures of the object at successive equal time intervals on a single sensitized area and determining the relation between the distance traveled by the object during successive or different time intervals.

And, another object is to provide a method for accomplishing the end mentioned which involves photographing the moving object on a fixed sensitized surface through a lined screen which is moved across the focal plane in a direction substantially parallel to the direction of movement of the object and at sufficiently high speed to effectively stop movement of the object as it appears on the record. The screen is moved across the sensitized surface by such an amount that a plurality of successive images of the object appear across the record by virtue of multiple exposure; said images being rendered apparent and segregated from all other images included in the record by viewing the record through a lined screen like that through which it was exposed.

And, a further object of the invention is to provide improved methods of making the exposures through the lined screen so that successive images exposed on the sensitized surface by multiple exposure will be readily apparent for observation as to their relative displacement.

2

Figure 2:
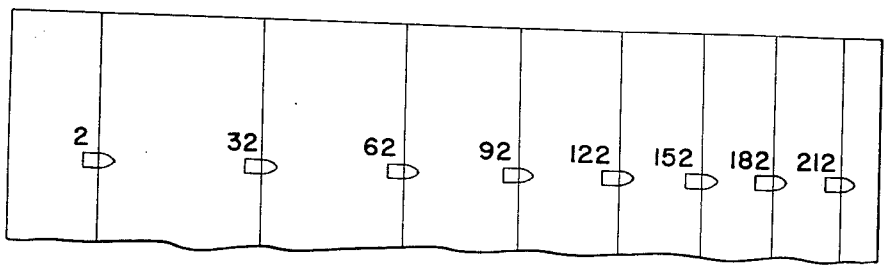
Figure 3:
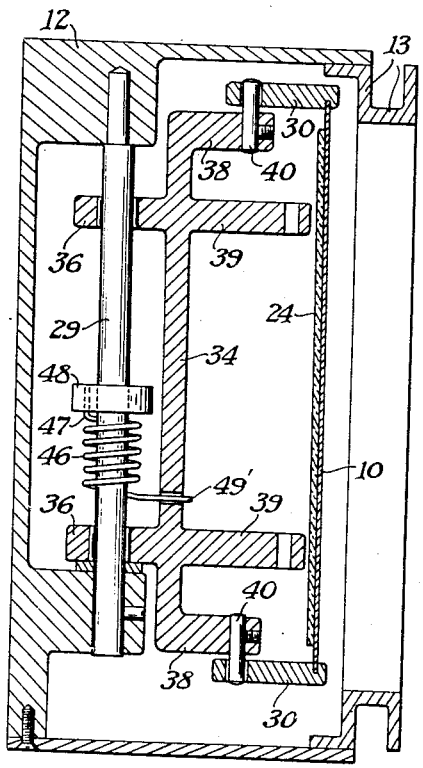

The novel features that we consider characteristic of our invention are set forth with particularity in the appended claims. The invention itself, however, both as to its organization and the steps and results involved therein, together with additional objects and advantages thereof, will best be understood from the following description when read in connection with the accompanying drawings, in which Figs. 1 and 2 schematically illustrate how a photographic record of a bullet might appear when exposed and viewed in accordance with a preferred embodiment of the present invention;

Fig. 3 is a vertical sectional view showing a high-speed camera back capable of making a photographic record in accordance with the present invention.

Like reference characters refer to corresponding parts throughout the drawings.

In its broadest sense, the present invention involves taking a plurality of instantaneous pictures of a moving object at known successive time intervals on a sensitized surface and observing the relation between the distances traveled by the object during the successive intervals of time in the direction of motion of the object. If the distance between successive instantaneous images increases, then the object is known to be accelerating; while, if it decreases, then the object is known to be decelerating. The invention also contemplates photographing a distance scale on the record from which the actual distance traveled by the object in space for a given displacement of its image on the record can be obtained so that actual values of velocity and acceleration of the object at any instant, or over a given time interval, can be figured. The problems involved in this method include, first, making instantaneous exposures of high-speed objects; second, making a plurality of such exposures at successive equal intervals of time, and third making these successive exposures at intervals which will permit the object to be photographed a plurality of times in displaced relation during its travel over a given path. We have found that the solution to these problems can be had by using the lined screen principle of taking and viewing high-speed pictures and modifying the exposure technique to some extent.

U. S. patent application Serial No. 114,352, filed September 7, 1949, now U. S. Patent 2,578,327 which issued December 11, 1951, which relates to a high-speed camera of the lined screen type, discloses how, with every translation of the exposing screen a distance equal to the width of one of the lines thereof, a complete new motion picture "frame" is exposed. As is well known, these motion picture "frames" will comprise a composite picture made up of a plurality of linear image elements corresponding in shape and spacing with the lines of the screen and which, when viewed selectively and simultaneously through a lined screen like that through which they were exposed, will be simultaneously observed and visually combined to form a complete image or picture of the object. If the lines of the exposing screen are equally spaced apart by a distance which is a multiple of the width of the lines, then each time the screen is moved a distance equal to one line width, a new composite picture will be exposed on the sensitized surface behind the screen. The number of single exposures available with a given size photographic plate is equal to the ratio of the widths of the transparent and opaque lines of the screen. If the exposing screen continues to move after it has traveled a distance sufficient to expose all of the "frames" provided by this ratio, then double exposure begins. Inasmuch as double exposure is objectionable in the conventional applications of this camera, the camera of the above-noted application is provided with a "capping shutter" to prevent double exposure. In the referred-to camera, the exposing lined screen had transparent lines .001" wide spaced on .030" centers, so that the screen could take 30 different composite pictures, with a screen movement of .030" without double exposure difficulties.

According to the present invention, we modify the exposure technique of the lined screen principle of high-speed photography to make use of the multiple exposure possibilities thereof. Let us assume that a moving object is photographed on a fixed sensitized surface, or photographic plate, with a moving grid high-speed camera in which the grid or screen is caused to travel, at a uniform velocity, a distance greater than that required to cover the "frames" available; or, saying it in another way, by a distance greater than the ratio between the widths of the transparent and opaque lines of the grid. This will produce what might be called a multiple double exposure, since, in the assumed case, if the lined screen had the dimension to do so, after it had completed the 30th exposure and continued to move across the plate, it would start to double expose the plate at the instant it moved .031" and would double expose all "frames" through its movement up to .060", and then would start to triple expose at .061"—etc., adding to the plate exposure at each .030" of its travel.

In order to measure the acceleration of the moving object, this extended travel of the screen must be completed within the time during which the moving object is in the camera field. Immediately following the opening of the conventional camera shutter, or let us say the uncapping of the lens, the grid or screen traverses a distance equal to that covered by the number of frames available, 30 in the assumed case of .001" lines on .030" center, and a series of 30 exposures are made on the plate which show the motion of the object during this time. Any one of these 30 frames, for example, the first, shows an instantaneous composite picture of the object because with this camera it is possible to obtain exposures as fast as 1/1,000,000/second.

According to the present invention, movement of the exposing screen is continued, and this reexposes areas of the emulsion which have been exposed before, thus taking another series of "available frames," i. e., 30 in the assumed case, which show the progress of the object during this period of time following the initial series of pictures. For adequate measurement of acceleration, the physical extent of the grid travel should be such that this reexposure occurs several times. For example, in the assumed case of a screen having .001" wide transparent lines on .030" center, where the number of "available frames" is 30, and are exposed when the screen moves .030", if the screen is moved .210", or a little less than ¼", then 7 reexposures of 30 frames each will appear on the plate along with the first exposure giving a total of 8 pictures, see Fig. 1. If the screen is moved across the plate with a uniform velocity, then each reexposure of the plate occurs at equal time intervals in succession, said time intervals depending upon the speed of movement of the screen and the ratio of the widths of the transparent and opaque lines of the screen.

After the plate is exposed in the manner set forth above it is processed and this photographic record is placed in a proper viewer to be viewed through a stationary lined screen, like that through which it was exposed. With the viewing screen stationary in front of the stationary record in any position with its transparent lines aligned with a given group of linear image elements of the record, several different instantaneous positional images of the object photographed will be seen spaced across the field of the viewing screen. In Figs. 1 and 2 we have shown schematically what the record of a bullet might look like if photographed and viewed in the manner set forth, and if the exposing screen was moved by an amount to give 7 reexposures of the plate plus the initial exposure for a total of 8. Because there were 7 reexposures of the plate, 8 separate pictures of the bullet will be seen in any one position of the viewing screen.

This comes about as follows. Let us assume that the width of our screen lines is .001", and that they are spaced on .030" center. We then have available on the plate a total of 29 frames in addition to the starting or first frame. When the viewing screen is in proper position to pass the instantaneous image of the record recorded on the first frame, there will appear, in addition, a ghost image which was recorded at the 31st frame on the same emulsion area by the exposing grid continuing to move after it had covered the 29 frames available up to the point double exposure began. Although this ghost image is recorded on the same area of the plate as the first frame is, it was recorded at a time later by 30 times the exposure time for one frame, and since, during this length of time the object was moving, the images are separated on the photographic plate. Further grid travel can provide 61st, 91st, etc., ghost images visible concurrent with the image recorded on the first frame. In the assumed case of 8 reexposures, the last ghost image would be the 211th, as indicated in Fig. 1. It is pointed out that during each complete exposure of the plate, which takes .030" movement of the exposing screen, 30 different composite pictures of the object are taken at equal time intervals determined by the speed of movement of the screen. Thus, if 8 reexposures are made, then there are actually 8×30, or 240 different composite exposures made on the plate. However, when one is looking at the record through a stationary lined screen, at any one instant he is capable of seeing only every 30th picture element across the record so that, consequently, the composite pictures he sees will be those taken at successive intervals of .030" increment of movement of the exposing screen. As shown in Fig. 2, if the viewing screen is moved .001" to the right, then the observer will see the 8 pictures of the bullet taken at successive intervals which may be designated 2—32—62—212, and which are each 30 increments of screen movement apart.

If the bullet were moving with a uniform velocity during the exposure, each of the 8 composite pictures observed would be separated from its neighbor in the direction of movement of the bullet by a constant distance. The fact that the successive composite images of the bullet in Figs. 1 and 2 are spaced apart by decreasing amounts in the direction of movement of the bullet, directly indicates that the bullet was decelerating over the recorded portion of its travel. If the spacing between successive composite pictures appeared to increase in the direction of travel of the bullet, then a positive acceleration would be indicated.

The actual values of velocity and acceleration of the bullet can be obtained if the speed of movement of the exposing screen, and the actual distance an object moves in space for a given displacement of image on the plate, are known. The actual distance of travel of the bullet in space for a given displacement of its image on the record can be readily obtained if the magnification, or, more accurately, the reduction factor of the camera lens is known. It can be more directly obtained by photographing a distance scale on the record, as shown at "S" in Fig. 1, at the same time the object is photographed. If this scale is substantially in the plane of movement of the bullet, it will be photographed on the plate in the same proportion as the bullet, and if it is marked in inches, feet, etc., the displacement between successive images of the bullet can be read off this scale as actual distance traveled by the object in space. Since such a scale would be stationary in the field of the camera, it would appear in the viewer at every position of the viewing screen and at the same point in the field.

Any suitable grid type high-speed camera could be used for making the exposure according to this invention, so long as it is provided with a grid and driving means therefor which will allow for the added movement thereof necessary for the multiple exposures of the photographic plate. In fact, the high-speed camera disclosed in noted copending patent application Serial No. 114,352, could be used with slight modification, and for purposes of illustrating an apparatus by which our invention could be carried out, we have shown the essential parts of this camera in Fig. 3. Since said camera is completely disclosed in the above-noted copending patent application, along with the fact that it provides no part of the present invention per se, we have shown and will describe only the features and modifications thereof which are essential to an understanding of the present invention. As shown, this camera may comprise a special back adapted to be placed on the rear of a conventional camera of the press or view type in place of the regular camera back and consists of a rectangular housing 12, the front wall of which is provided with an opening surrounded by a channel-shaped connecting flange 13 similar to that found on removable backs of conventional view cameras. A suitable sensitized surface, i. e., a 4" x 5" photographic plate 24, is removably mounted in the camera back by means not shown, so that its emulsion surface is accurately positioned in the focal plane of the camera lens.

A lined exposing screen 10 is disposed immediately in front of the photographic plate in parallel relation thereto and generally with the lines thereof extending transversely of the plate and vertically, since most motion is recorded in a generally horizontal direction. This exposing screen may preferably be a glass photographic plate which has been exposed and processed so as to possess lines .001" wide, spaced on .030" center, and must be moved across the photographic plate rapidly and as close thereto as is practically possible so that the lines of the screen act as physical masks and eliminate "bleeding" of one composite image into another. For use in the present method, this screen should be enough longer than the plate to permit the screen to move far enough across and relative to the plate to produce the desired multiple exposure thereof without uncovering the same. In order to hold the lined screen flat and allow it to be moved rapidly across the photographic plate, it is held in a stretched condition between a pair of binding strips, not shown, extending across the top and bottom thereof and above and below the plate so that they do not interfere with locating the screen close to the plate.

The screen 10 is moved rapidly across plate 24 at a uniform velocity by a spring-driven mechanism including driving links 30 connected at one end to the binding strips of the screen and at the four corners thereof. Since Fig. 3 is a vertical section taken substantially through the center of the camera back, only the driving mechanism at one end of the screen is shown. It is pointed out, however, that the elements of the drive are essentially duplicated at each end of the screen, as will be evident from an inspection of the noted application Serial No. 114,352 relating to this specific camera. The other ends of the driving links 30 are in turn pivoted on pivot pins 40 fixed in arms 38 of a driving lever 34, arms 36 of which are in turn journaled on a fixed shaft 29 extending vertically of the camera back. The screen is adapted to be moved rapidly across the focal plane of the camera from a cocked position by coiled spring 46 surrounding shaft 29 and having one end 47 fastened to a flange 48 fixed to shaft 29 and the other end 49' acting against driving lever 34. The pivotal connection between driving links 30 and arms 38 of driving lever 34 permits the screen to move in a straight line across the focal plane despite the fact that driving levers 34 swing through an arc in so driving the screen. Arms 39 on driving levers 34 are normally used on this camera for driving the "capping" shutter which is used to prevent double exposure when this camera is used in the conventional manner. However, since in the present method multiple exposure is necessary, the camera is modified by omitting the capping shutter.

It will be apparent that in order to obtain satisfactory results with this method, the image of the object must be small enough to take up only a percentage of the complete sensitized area in any one instantaneous position, so that the object can be photographed in several displaced positions on the plate during its travel over a given path. This does not necessarily mean, however, that the image has to be so small on the plate and the speed of the exposing screen such that the successive images of the moving object are completely displaced from one another as shown. The successive images of the object on the plate could overlap one another so long as the object had a shape which would permit the displacement between successive images to be recognized and measured.

Considerable improvement by a simple ramification can be expected in the results obtained when this method is used to photograph light objects against a dark background by reflected light. Since multiple exposure takes place several times over the same film area during the series of exposures, it is highly probable, of course, since the object was moving, that the image of a light area will be superposed upon areas which have been black in previous frames. The difference in reflecting power between a light object and a dark background can at best be a factor of 100. Thus, with very high illumination (which is necessary because of the extremely short "frame" exposure time), a considerable amount of light will be reflected from the black backgrounds and will give some general exposure over the plate. Since the light intensity from the white object is only 100 times greater, or two units on the log scale at best, this results in considerable degrading of the image as successive multiple exposures are made.

If necessary, this condition can be improved by simply putting a fluorescent phosphor having a very short decay time on the object and illuminating the object with a very high intensity flash lamp of the gaseous discharge type having short duration. This, in effect, will lengthen the exposure time in the light object areas and shorten it in the dark background region. Since the light intensity of these gaseous discharge flash lamps is so great as to cause overexposure in some instances, the phosphor can act as a volume limiter since it will saturate at a level considerably lower than that of the flash lamp peak. A still further improvement in this condition can be obtained if the object is coated with a phosphor of the type which is excited to brilliance by ultraviolet light or other suitable invisible luminoginous radiation. Then the object could be continually illuminated by ultraviolet light which is not readily reflected from a dark background, as the result of which light from the background would offer little or no fogging to the film. Should the sensitive surface being used be too sensitive to ultraviolet light, and less sensitive to the invisible rays like infrared or X-rays, then the object could be coated with an infrared or X-ray stimulable phosphor and this form of energy could be used to illuminate the photographic field and to stimulate this phosphor to brilliance as it moved into and across the field of the camera.

In order to generically define all of those invisible radiations which are capable of causing phosphors to fluoresce or luminesce, we have referred to them as luminoginous radiations.

While we have disclosed certain modifications of our invention, we are aware that many other modifications thereof are possible within the scope of the present invention. Our invention, therefore, is not to be limited to the specific steps disclosed by way of illustration to obtain the desired results, but is intended to cover all modifications thereof coming within the scope of the present invention.

Having thus described our invention, what we claim is new and desire to secure by Letters Patent of the United States is:

1. The method of determining the acceleration characteristics of an object moving at high speed with a substantially rectilinear motion comprising the steps of making a photographic record of the moving object by photographing it on a sensitized surface through a lined screen, the transparent lines of which are separated by distances equal to a multiple of the width of said lines, moving said screen during the exposure across the focal plane with a uniform velocity sufficiently high to substantially stop motion of the object on said surface, and in a direction substantially parallel to that of the movement of the object and by an amount such that each line of the screen travels a distance equal to a multiple of the spacing between two adjacent lines, whereby said surface is multiply exposed at successive equal time intervals with composite pictures of said object in different positions of its movement each made up of line images corresponding in dimension and spacing with the lines of said screen; placing in front of said photographic record a lined screen like that through which it was exposed but stationary relative to said record and with the lines thereof aligned with certain image elements of said record, whereby a plurality of separate composite pictures of the object will be seen displaced from each other along said record in the direction of movement of the object, for determining the relation between the displacement of successive pairs of these observed composite pictures to ascertain the acceleration characteristics of the moving object.

2. The method of determining the acceleration characteristics of an object moving at high speed with a substantially rectilinear motion comprising the steps of making a photographic record of the moving object by photographing it on a fixed sensitized surface through a lined screen the transparent lines of which are separated by distances equal to a multiple of the width of said lines and so that the image of the object formed in the focal plane is of such size that it occupies only a small percentage of the sensitized surface in any instantaneous position; moving said lined screen during the exposure across the focal plane with a uniform velocity sufficiently high to substantially stop motion of the object on said surface and in a direction substantially parallel to that of movement of the object and by an amount such that each line of the screen travels a distance equal to a multiple of the spacing between two adjacent lines, whereby said surface is multiply exposed at successive equal time intervals with composite images of said object which are physically separated from one another across said record, each composite image made up of a plurality of line images corresponding in dimension and spacing with the lines of said screen; superimposing on said photographic record a lined screen like that through which it was exposed but stationary relative to said record and with the lines thereof aligned with certain image elements of said record, whereby a plurality of separate composite pictures of the object will be seen spaced from each other along said surface by equal time intervals in the direction of movement of said object for the purpose of determining the relation between the separation of successive pairs of these observed composite pictures to ascertain the acceleration characteristics of the moving object.

3. The method according to claim 1, including the step of photographing a distance scale on said sensitized surface at the same time said object is photographed, said distance scale being stationary, extending in the direction of movement of the object and located substantially in the plane of the object so that it will be reproduced on the record in the same ratio of magnification as the object itself, whereby the actual distance traveled by the object between exposures can be read from said record to obtain a measure of the acceleration of the object.

4. The method according to claim 1, including the steps of rendering the object highly reflective and photographing it against a background of low reflectance by the use of reflected light.

5. The method of determining the acceleration characteristics of an object moving at high speed with a substantially rectilinear motion comprising the steps of coating the object with a fluorescent phosphor material having a short decay time, making a photographic record of the moving object on a sensitized surface through a lined screen, the transparent lines of which are separated by distances equal to a multiple of the width of said lines, by photographing it against a dark background using a light of high intensity and short duration to illuminate the object and excite the phosphor coating thereon, moving said screen during the exposure across the focal plane with a uniform velocity sufficiently high to substantially stop motion of the object on said surface, and in a direction substantially parallel to that of the movement of the object and by an amount such that each line of the screen travels a distance equal to a multiple of the spacing between two adjacent lines, whereby said surface is multiply exposed at successive equal time intervals with composite pictures of said object in different positions of its movement, each made up of line images corresponding in dimension and spacing with the lines of said screen; illuminating said photographic record through a lined screen like that through which it was exposed but stationary relative to said record and with the lines thereof aligned with certain image elements of said record, whereupon a plurality of separate composite pictures of the object will be seen through said screen displaced from each other along said record in the direction of movement of the object, for the purpose of determining the relation between the displacement of successive pairs of these observed composite pictures to ascertain the acceleration characteristics of the moving object.

6. The method of determining the acceleration characteristics of an object moving at high speed with a substantially rectilinear motion comprising the steps of coating the object with a phosphor material capable of being excited to radiate visible light upon being subjected to invisible luminoginous radiation, making a photographic record of the moving object by subjecting said object to said invisible luminoginous radiation and photographing it on a sensitized surface through a lined screen, the transparent lines of which are separated by distances equal to a multiple of the width of said lines and so that the image of the object formed in the focal plane is of such size that it occupies only a small percentage of the sensitized surface in any instantaneous position; moving said lined screen during the exposure across the focal plane with a uniform velocity sufficiently high to substantially stop motion of the object on said surface and in a direction substantially parallel to that of movement of the object and by an amount such that each line of the screen travels a distance equal to a multiple of the spacing between two adjacent lines, whereby said surface is multiply exposed at successive equal time intervals with composite images of said object which are physically separated from one another across said record, each composite image made up of a plurality of line images corresponding in dimension and spacing with the lines of said screen; placing in front of said photographic record a lined screen like that through which it was exposed but stationary relative to said record and with the lines thereof aligned with certain image elements of said record, whereupon a plurality of separate composite pictures of the object will be seen spaced from each other along said surface by equal time intervals in the direction of movement of said object and from the relation between the separation of successive pairs of these observed composite pictures to be ascertained the acceleration characteristics of the moving objects.

FORDYCE E. TUTTLE.
WALTER C. NEWCOMB.

References Cited in the file of this patent

UNITED STATES PATENTS

| Number | Name | Date |
|---|---|---|
| 516,278 | Petri | Mar. 13, 1894 |
| 1,150,374 | Kanolt | Aug. 17, 1915 |
| 1,260,682 | Kanolt | Mar. 26, 1918 |
| 1,413,187 | Paumier | Apr. 18, 1922 |
| 1,501,842 | Duda | July 15, 1924 |
| 1,950,374 | Kanolt | Mar. 6, 1934 |
| 1,984,004 | Wildhaber | Dec. 11, 1934 |
| 2,259,228 | Rankin | Oct. 14, 1941 |
| 2,460,163 | Bowen | Jan. 25, 1949 |

FOREIGN PATENTS

| Number | Country | Date |
|---|---|---|
| 7,522 | Great Britain | Mar. 31, 1913 |
| 421,120 | Great Britain | Dec. 10, 1934 |

OTHER REFERENCES

Talbot, F. A. "Moving Pictures," published in 1912 by J. B. Lippincott Co., Philadelphia, Penn. pages 17 through 20 and plate facing page 17.